W. B. KLEIN.
FILTER PLATE.
APPLICATION FILED MAY 2, 1908.

No. 902,972. Patented Nov. 3, 1908.

Witnesses:

Inventor:
William B. Klein
by Banning & Banning
Attys.

UNITED STATES PATENT OFFICE.

WILLIAM B. KLEIN, OF CHICAGO, ILLINOIS.

FILTER-PLATE.

No. 902,972.      Specification of Letters Patent.      Patented Nov. 3, 1908.

Application filed May 2, 1908. Serial No. 430,512.

*To all whom it may concern:*

Be it known that I, WILLIAM B. KLEIN, a citizen of the United States, residing at Chicago, in the county of Cook and State of Illinois, have invented certain new and useful Improvements in Filter-Press Plates, of which the following is a specification.

The plate of the present invention is intended for use in a filter press of the style which is made up of a plurality of filter plates arranged face to face and compressed together by suitable means to constitute, in effect, a filter for the purpose of filtering beer or other liquids admitted thereto. Filter presses of this style are not packed in the ordinary manner but are made up from a plurality of plates, each of which has previously been packed, so that in order to set up or assemble the filter press the individually packed plates are arranged in position and compressed together to a suitable degree, thereby constituting a complete filter press of a style quite generally in use. The advantages of a press of this kind are due to the fact that individual plates can be removed from the press as a whole and others substituted, and that any desirable number of plates can be used in making up the filter, thereby enabling the user to regulate the size and capacity of the filter in accordance with the particular conditions encountered.

The object of the present invention is to so construct the filter plates that the filtering body or packing will be firmly and tightly held in position within the surrounding metallic ring, so that no difficulty will be experienced in having the packing fall out of the ring prior to assembling of the filter.

The invention further relates to the means provided for admitting and withdrawing the liquid and conveying the same through the filtering material, the flow of the liquid being so regulated that the pressure exerted thereby will tend to keep the packing firmly embedded within the ring rather than disengage the packing therefrom, as has been the case in certain prior constructions.

The invention consists of the features of construction and combination of parts hereinafter described and claimed.

Figure 1:
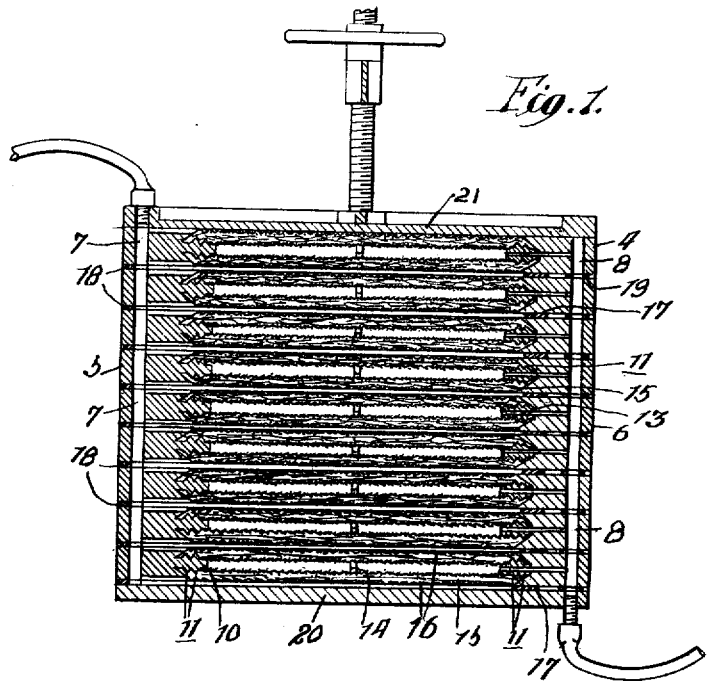
Figure 2:
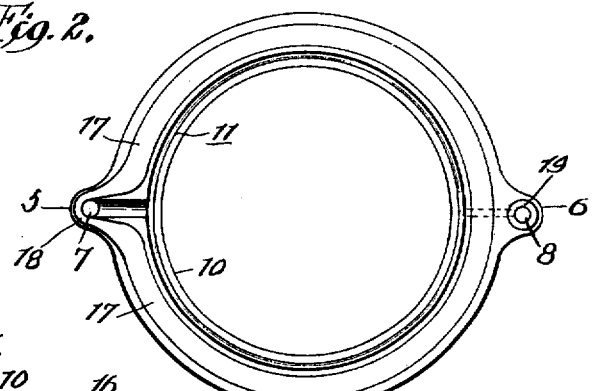
Figure 3:
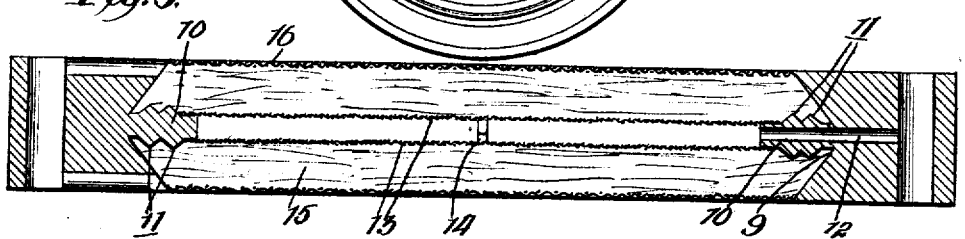

In the drawings, Figure 1 illustrates a sectional view of a filter made up in the manner previously described; Fig. 2 a face view of the ring of one of the filter plates; and Fig. 3 an enlarged sectional view of one of the filter plates, showing the packing therein.

Each of the filter plates comprises a circular ring or collar 4, preferably formed of metal, which ring or collar is provided, at suitable points in its periphery, with outwardly projecting ears or lugs 5 and 6, respectively, which are bored out to provide vertical channels 7 and 8 for the inflow and the outflow of the liquid. The ring or collar, on its inner edge 9, is inwardly beveled or channeled to provide overhanging walls or edges which terminate in the center in an outwardly projecting annular rib 10 provided on opposite sides with annular teeth 11 which underlie the overhanging beveled wall of the ring. The rib 10, at a point adjacent the outlet channel 8, is provided with a bore 12 which establishes communication between the center of the ring and the outlet channel. In like manner, at a point adjacent the inlet channel, the ring is provided with a trough-like inlet passage which communicates with the interior of the ring near the surface thereof. The annular rib 10 serves as a support for a pair of circular screens 13 which are preferably connected together in the middle by a suitable clip 14 which prevents the lowermost screen from displacement prior to the application of the packing.

The packing 15 is inserted into the ring from both sides and is compressed to fill into the space underlying the overhanging beveled walls of the ring, and is likewise embedded within the annular teeth on opposite sides of the center rib, so that after the packing has been compressed in place it will be thoroughly embedded or mortised into the ring in such manner that accidental displacement will be impossible. After the packing has been thus embedded, the plate is completed by providing a circular screen 16 which overlies the packing.

In order to provide against leakage, when the plates are assembled, a circular washer 17 is inserted between each of the rings, which washer is provided on one side with an outwardly projecting open tongue 18 which serves to clear the inlet channel and at the same time affords protection against the escape of liquid at this point. A small circular washer 19 surrounds the outlet channel 8, so that escape of liquid is prevented at this point.

In assembling the filter, a number of rings, constructed as above specified, are laid one above the other with the vertical inlet and outlet channels or passages in register and with the washers inserted between the rings to prevent the escape of liquid. The filter press is provided with a base plate 20 and a compression cover 21 which serve to compress the individual filter plates together sufficiently to form the assembled plates into an integral filter structure.

In use, the liquid admitted through the vertical inlet passage will flow laterally therefrom through the trough-like channels communicating therewith, and the liquid so admitted will enter the meshes of the outer sections of screening which lie intermediate the packing of the adjacent filter plates. The liquid thus admitted to the intermediate screen will flow into the packing on both sides of the screen, and the pressure of the admitted liquid will act against the packing in such manner as to hold it firmly embedded within the annular teeth in the center of the packing rings. The pressure under which the liquid is admitted causes it to filter through the packing and into the inner screen sections, whence it will flow through the discharge bore 12 and into the discharge channel or passage. The construction is one which holds the packing firmly in position prior to the assembling of the filter and thereafter maintains the packing properly positioned against displacement under the action of the liquid admitted to the filter so that the filter will maintain its proper condition for a long period of time.

What I regard as new and desire to secure by Letters Patent is:

1. In a filter plate, the combination of a ring undercut on both sides to provide overhanging walls, a passage cut through the wall of the ring, a bore leading from the center of the ring and communicating with said passage, a second passage cut through the wall of the ring, and a trough-like channel communicating with said passage and cut through the surface of the ring, substantially as described.

2. In a filter plate, the combination of a ring undercut on both sides to provide overhanging walls, a passage cut through the wall of the ring, a bore leading from the center of the ring and communicating with said passage, a second passage cut through the wall of the ring, a trough-like channel communicating with said passage and cut through the surface of the ring, and an annular rib inwardly projecting from the center of the inner or undercut edge of the ring, substantially as described.

3. In a filter plate, the combination of a ring undercut on both sides to provide overhanging walls, a passage cut through the wall of the ring, a bore leading from the center of the ring and communicating with said passage, a second passage cut through the wall of the ring, a trough-like channel communicating with said passage and cut through the surface of the ring, an annular rib inwardly projecting from the center of the inner or undercut edge of the ring, and annular teeth on said rib, substantially as described.

4. In a filter plate, the combination of a ring undercut on both sides to provide overhanging walls, a passage cut through the wall of the ring, a bore leading from the center of the ring and communicating with said passage, a second passage cut through the wall of the ring, a trough-like channel communicating with said passage and cut through the surface of the ring, an annular rib inwardly projecting from the center of the inner or undercut edge of the ring, annular teeth on said rib, and a packing within the ring and compressed within the overhanging walls and into the annular teeth, substantially as described.

5. In a filter plate, the combination of a ring undercut on both sides to provide overhanging walls, a passage cut through the wall of the ring, a bore leading from the center of the ring and communicating with said passage, a second passage cut through the wall of the ring, a trough-like channel communicating with said passage and cut through the surface of the ring, an annular rib inwardly projecting from the center of the inner or undercut edge of the ring, annular teeth on said rib, a packing within the ring and compressed within the overhanging walls and into the annular teeth, two inner pieces of foraminous material supported upon opposite sides of the inner toothed rib, and an outer piece of foraminous material overlying the outside of the packing, substantially as described.

6. A filter press comprising a plurality of filter plates laid face to face, each of the plates comprising a surrounding ring having inlet and outlet passages cut therethrough to form continuous inlet and outlet channels, the inner edges of the rings being undercut from both sides and provided, in the center, with an inwardly extending rib having teeth on opposite sides, the ring having cut through the rib or center-bore communicating with one of the passages and having cut through the surface of the ring a trough-like channel communicating with the other passage, inner sections of foraminous material supported by the inwardly projecting annular rib, packing sections entered into opposite sides of the ring and inclosing the inner foraminous sections and compressed under the overhanging walls of the ring and into the annular teeth, and outer sections of foraminous material intermediate the packing of adjacent rings, substantially as described.

WILLIAM B. KLEIN.

Witnesses:
SAMUEL W. BANNING,
WALKER BANNING.